US009895802B1

(12) United States Patent
Hickman et al.

(10) Patent No.: US 9,895,802 B1
(45) Date of Patent: *Feb. 20, 2018

(54) PROJECTION OF INTERACTIVE MAP DATA

(71) Applicant: X Development LLC, Mountain View, CA (US)

(72) Inventors: Ryan Hickman, Mountain View, CA (US); Anthony G. Francis, San Jose, CA (US); Thor Lewis, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,758

(22) Filed: Sep. 14, 2016

Related U.S. Application Data

(63) Continuation of application No. 14/547,010, filed on Nov. 18, 2014, now Pat. No. 9,473,594, which is a continuation of application No. 13/440,600, filed on Apr. 5, 2012, now Pat. No. 8,918,208.

(60) Provisional application No. 61/595,862, filed on Feb. 7, 2012.

(51) Int. Cl.
*G05B 19/04* (2006.01)
*B25J 9/16* (2006.01)
*G06F 17/30* (2006.01)

(52) U.S. Cl.
CPC ...... *B25J 9/1664* (2013.01); *G06F 17/30268* (2013.01)

(58) Field of Classification Search
CPC ................... B25J 9/1664; G06F 17/30268
See application file for complete search history.

(56) References Cited

U.S. PATENT DOCUMENTS

| 8,918,208 | B1 * | 12/2014 | Hickman | B25J 9/1697 700/1 |
| 2012/0044265 | A1 * | 2/2012 | Khorashadi | G01C 21/206 345/641 |
| 2013/0346168 | A1 * | 12/2013 | Zhou | G06F 1/163 705/14.4 |
| 2014/0063055 | A1 * | 3/2014 | Osterhout | G06F 3/005 345/633 |

(Continued)

*Primary Examiner* — Ian Jen
(74) *Attorney, Agent, or Firm* — McDonnell Boehnen Hulbert & Berghoff LLP

(57) ABSTRACT

Methods and systems for robot cloud computing are described. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some example, a robot may be configured to receive a second device, such as mobile phone, that may be configured to function as an accessory or a "brain" of the robot. A robot may interact with the cloud to perform any number of actions, such as to share information with other cloud computing devices.

20 Claims, 11 Drawing Sheets

(56) References Cited

U.S. PATENT DOCUMENTS

2014/0114845 A1\* 4/2014 Rogers .................... G06T 15/08
705/39

\* cited by examiner

PROJECTION OF INTERACTIVE MAP DATA

CROSS REFERENCE TO RELATED APPLICATION

The present application claims priority to U.S. Provisional Patent Application Ser. No. 61/595,862, filed on Feb. 7, 2012, U.S. patent application Ser. No. 13/440,600, filed on Apr. 5, 2012, and U.S. patent application Ser. No. 14/547,010, filed on Nov. 18, 2014 the entire contents of each are herein incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

This disclosure may disclose, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition/control by a robot. In further embodiments, a robot may provide interactive map data. Additionally, a robot may interact with its surroundings based on map data. A robot may perform any actions or queries to the cloud as described herein based on contextual or situational information.

1. CLOUD COMPUTING ARCHITECTURE

Figure 1:
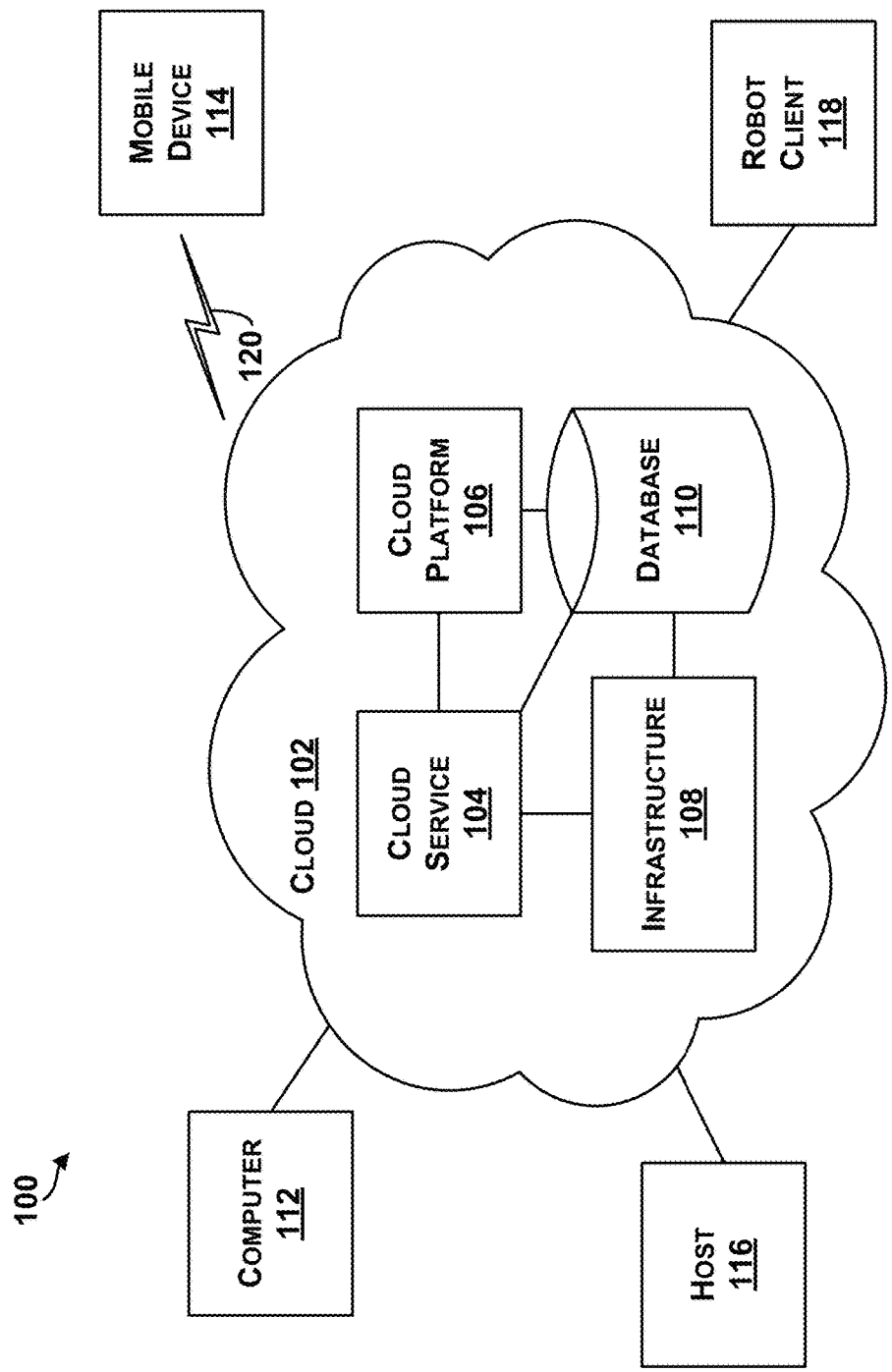
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. EXAMPLE ROBOT ARCHITECTURE

Figure 2A:
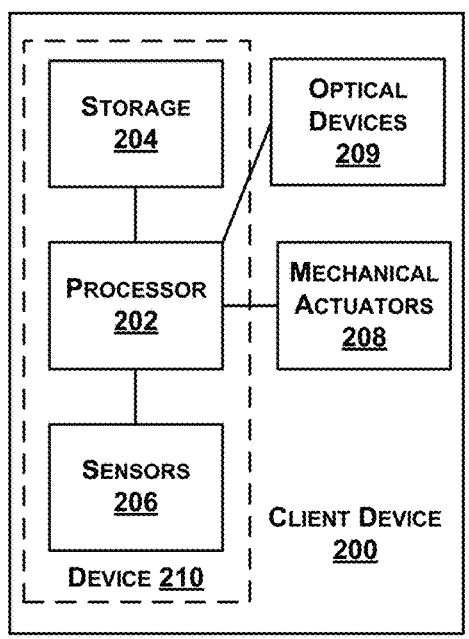
FIG. 2A illustrates an example client device.

FIG. 2A illustrates an example client device 200. In one example, the client device 200 is configured as a robot. In some examples, a robot may be contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment. Additionally, the client device 200 may have optical devices, such as projectors, lasers, light emitting diodes (LEDs), etc., that enable the client device 200 to interact with the environment through optical projection.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some example, the client device 200 may be configured to receive a device, such as device 210, that includes the processor 202, the storage 204, and the sensors 206. For example, the client device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, etc., that are included within the device 210.

Figure 2B:
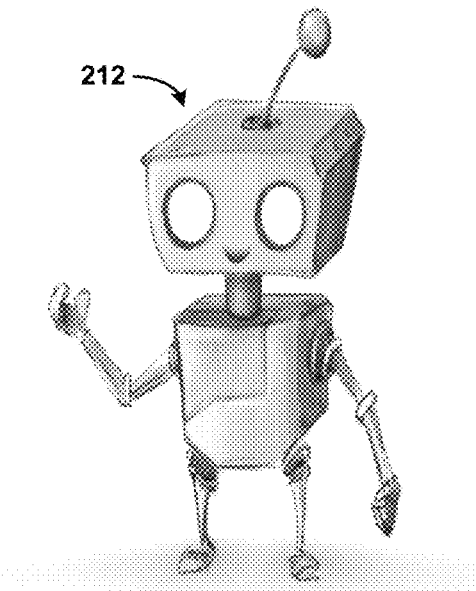
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such as a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
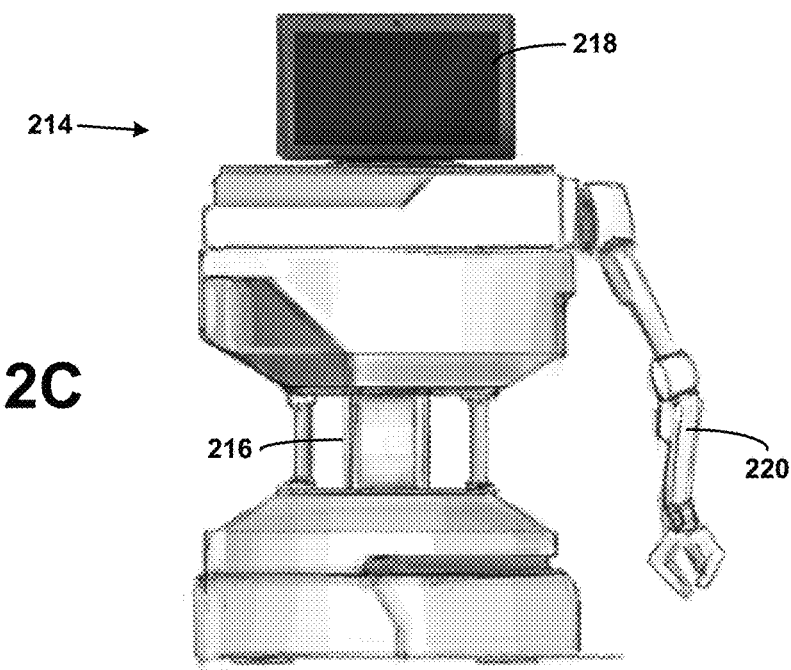
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

3. ROBOT AND CLOUD INTERACTION

Figure 3:
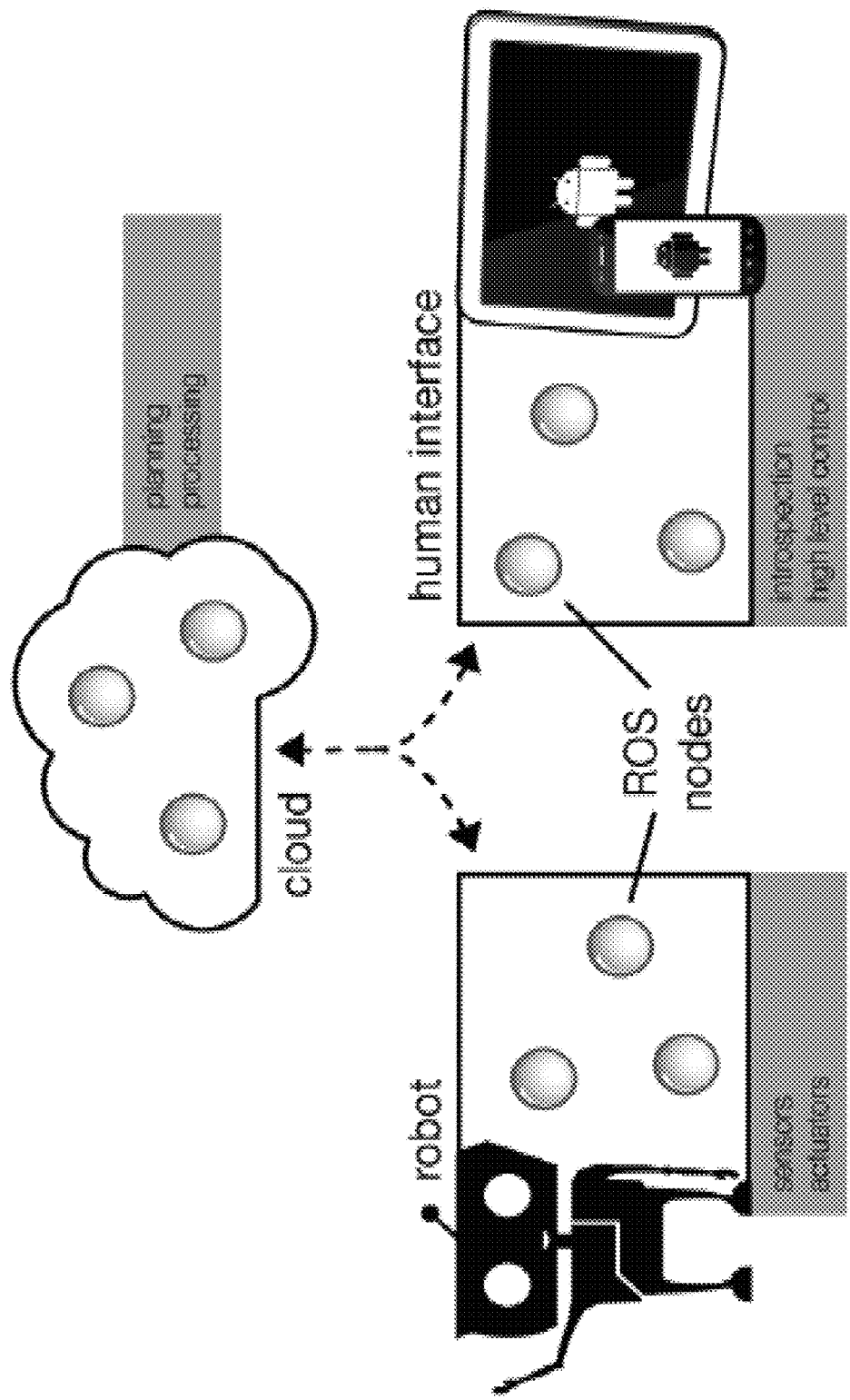
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
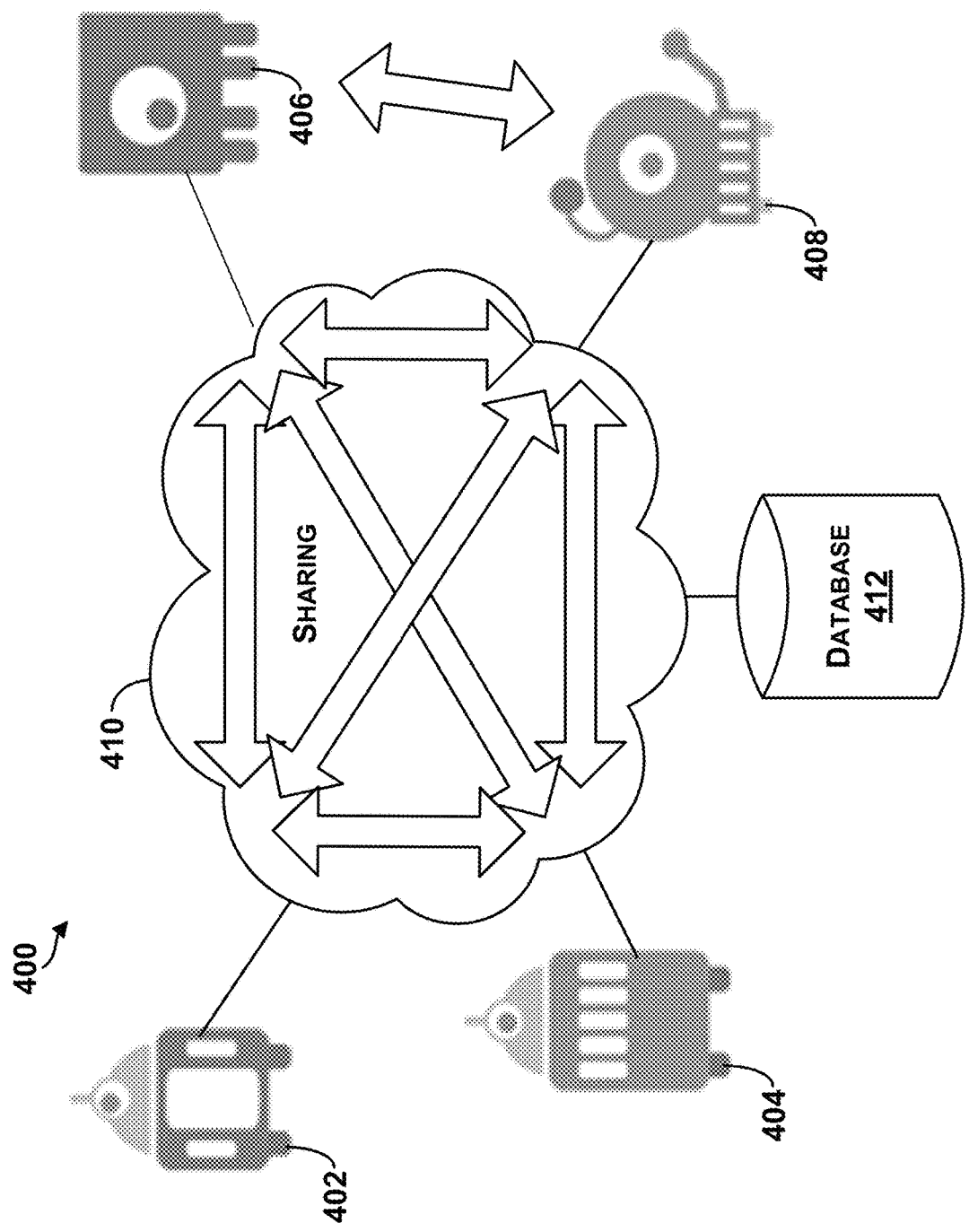
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and builds a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. ROBOT AND CLOUD FUNCTIONS

As mentioned, robots (or any client computing device) may interact with the cloud to perform any number of functions. Example functions are described below.

a. Object Recognition

Figure 5:
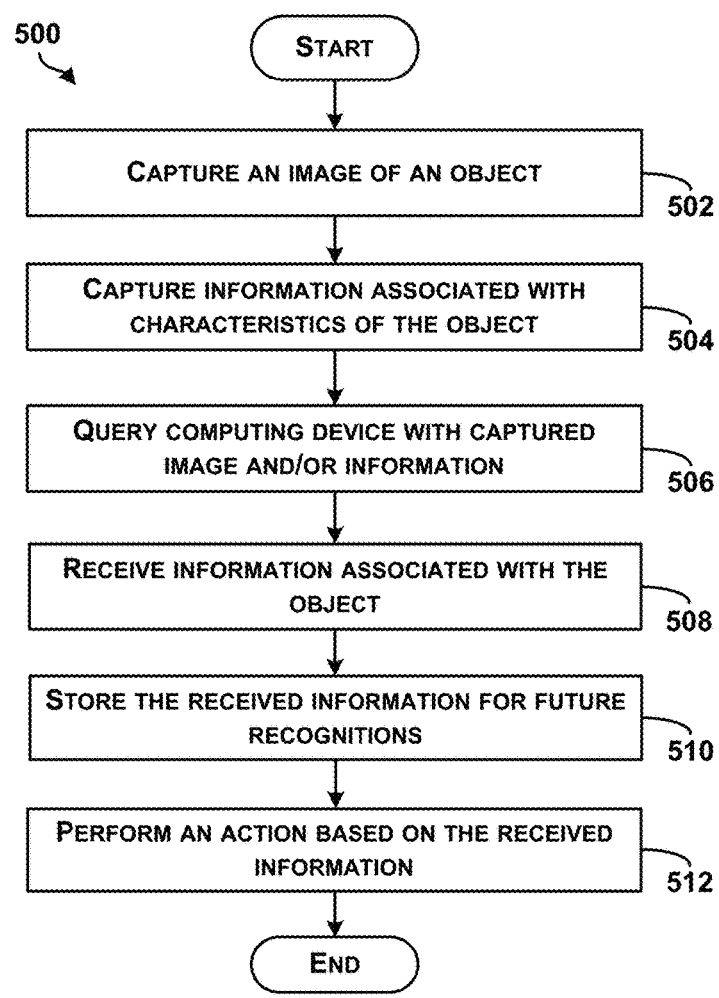
FIG. 5 is a block diagram of an example method of a robot interaction with the cloud to facilitate object recognition.

FIG. 5 is a block diagram of an example method of a robot interaction with the cloud to facilitate object recognition, in accordance with at least some embodiments described herein. Method 500 shown in FIG. 5 presents an embodiment of a method that, for example, could be used with the systems 100 and 400, for example, and may be performed by a device, such as another devices illustrated in FIGS. 1-4, or components of the device. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes capture an image of an object. In an example, a robot may capture many images of objects using any number of sensors, such as a camera (still pictures or video feeds), infrared projectors, etc.

At block 504, the method 500 includes capture information associated with characteristics about the object. For example, a robot may optionally determine or record a weight, dimensions, a texture, color, or any type of physical attribute of the object.

As another example, in an instance in which the robot may communicate with the object, the robot may capture additional data of the object, such as by accessing memory of the object. For instance, if the object has communication capabilities (such as WiFi, Bluetooth, infrared or other wireless or wired methods), the robot may communicate with the object to determine any type of data. Additionally, the object may have serial/parallel ports through which the robot may communicate with the object.

At block 506, the method 500 includes query a computing device with the captured image and/or information. As an example, the robot may query the cloud with a captured image by sending the captured image to the cloud and requesting information about the image, such as an identity of the image or information associated with characteristics of objects in the image. Alternatively, the robot may query another robot directly to request information about the object, such as an image of an alternate view of the object.

At block 508, the method 500 includes receive information associated with the object. For example, the robot may receive data from the cloud indicating an identity of an object in the image, or other information related to or associated with characteristics about the object. In some examples, the cloud may perform object recognition on the uploaded image or video. For example, if a picture was taken in a living room, the cloud may be able to identify a television. The cloud may even be able to recognize an exact model of television, and provide information regarding instructions for use of the television.

At block 512, the method 500 includes store the received information for future recognitions. For example, after receiving the information from the cloud, the robot would be able to recognize the object in the future enabling the robot to learn and adapt.

At block 512, the method 500 includes perform an action based on the received information. The action may vary based on a type of received information, or the query that is presented by the robot. As an example, a robot may capture an image of a coffee maker, provide the image to the cloud, and in response receive details about the coffee maker including an identity, model number, and instructions for use. The robot may then perform actions according to the instructions for use to use the coffee maker. As another example, a robot may open a refrigerator, take inventory of objects inside (e.g., capture images, identify objects), determine/receive recipes for possible meals based on the determined inventory, and suggest a meal based on items in the refrigerator.

As an example, the robot may query the cloud to identify an object and details of the object to enable the robot to interact with the object. If the received information is not fully accurate (e.g., the robot determines a different weight of the object), the robot can share this information with the cloud to update/modify a shared database in the cloud.

As an additional or alternative method for performing object recognition, objects may be tagged with a type of identifier (e.g., radio frequency identification (RFID) chip, near field communication chip (NFC), bar code, etc.), so that a robot may include an application enabling the robot to identify the object based on the identifier. The identifier may provide information about the object including an identification, details of the object (mass, color, type, brand, etc.), a location of the object, etc. In some examples, objects may emit beacons that can be received by the robots to determine existence/identification/location of the object. In this example, a physical environment may be instrumented with beacons in forms of NFC, RFID, QR codes, etc. to enable a robot to localize and identify objects. Beacons may be stationary beacons or moving beacons (RFID in an employee's ID badge) to perform tracking of objects.

Figure 6:
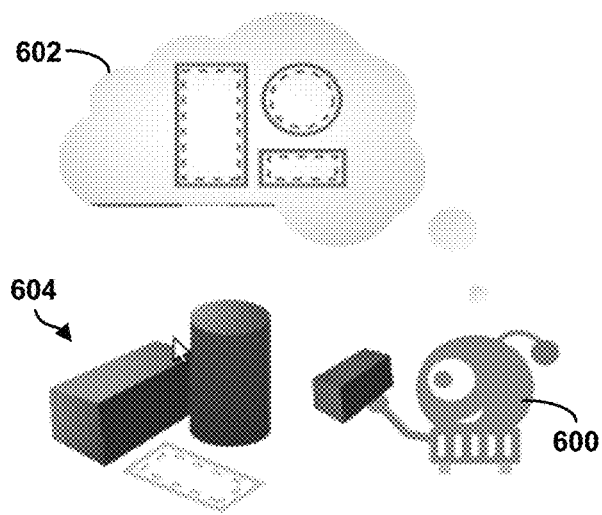
FIG. 6 is an example conceptual illustration of a robot interacting with a cloud to perform object recognition and interaction.

FIG. 6 is an example conceptual illustration of a robot 600 interacting with a cloud 602 to perform object recognition and interaction, or other functions as described in FIG. 5. The robot 600 may interact with an object (such as any of objects 604), and interact with the cloud 602 as described above to further interact with the object.

In some examples, the method 500 to facilitate object recognition may be a higher-level service (e.g., higher in a software stack), such that details and specifics for how to recognize an object may be performed by the cloud. The robot may be configured to perform actions/functions based on a result of object recognition, rather than or in addition to, performing functions regarding recognizing an object. As an example, using the method 500, the robot may execute software to perform function calls, such as GetObject( ), which may return information associated with an object (e.g., a cereal box), or PickUpObject( ), which may cause the robot to pick up the object. Enabling function calls and operation of robots through the cloud facilitates control and operation of the robot without having to control or operate various sensors/mechanical aspects of the robot, for example.

b. Mapping Functions

Figure 7:
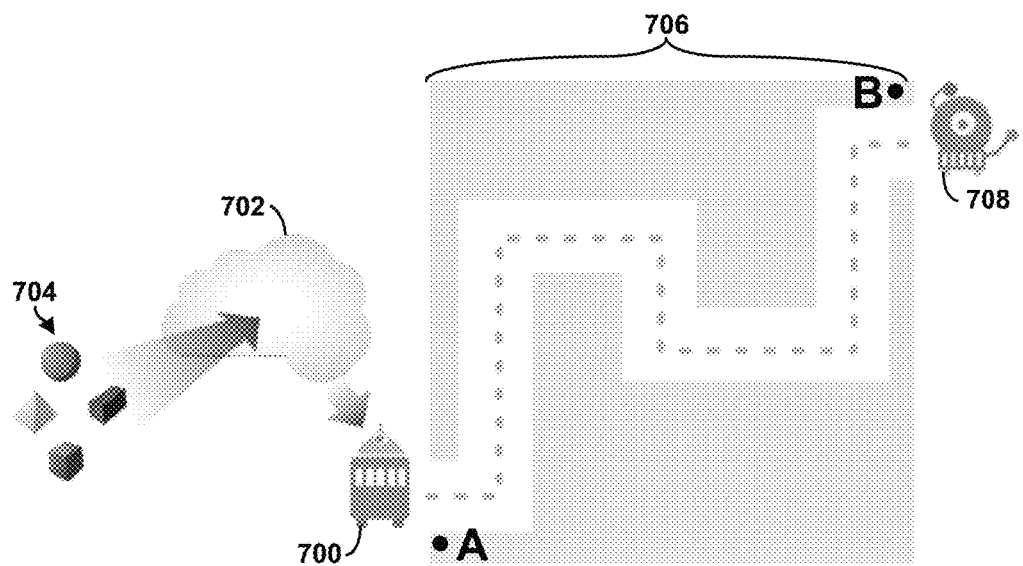
FIG. 7 is an example conceptual illustration of a mapping function.

FIG. 7 is an example conceptual illustration of a mapping function. A robot 700 may interact with a cloud 702 to perform functions as described in FIG. 5, for example, such as to perform object recognition queries of objects 704. The robot 700 may traverse through an area 706 in any number of pathways so as to map the area. As an example, the robot 700 may be configured to roam around an area in which the robot 700 is located to create a map of the area 706 (e.g., room of a house) with the aid of cloud processing. As the robot 700 navigates through the area 706 using any number of sensors to determine nearness to objects or capture images of objects, the robot 700 may relay data collected from various sensors to the cloud 702. The robot 700 may use sensors to return still pictures, video, location information, and distance information to the cloud computing system.

To perform mapping functions, the robot 700 may traverse through the area 706 capturing images using a range camera, video camera, etc., and send the data to the cloud 702. The robot 700 (or servers in the cloud 702) may identify objects within the data and provide annotations (such as mass, shape, material, etc.) of the objects. A computerized map may be generated to represent the area 706, and computer graphics (e.g., low resolution graphics) can be used to represent identified objects.

As another robot and cloud function, computer graphics within the generated map of the area 706 may be replaced with high resolution images of the objects. For example, the robot 700 may capture an image of a couch, and the cloud 702 may identify a specific model of the couch, and perform a search within a database to locate/identify a retailer that manufactures/sells the couch. A server in the cloud 702 may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Figure 8:
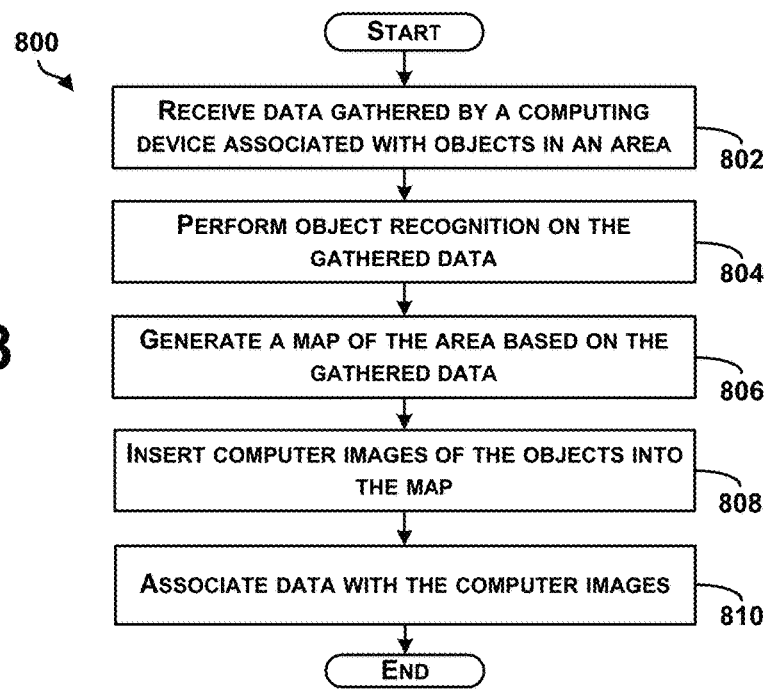
FIG. 8 is a block diagram of an example method for mapping of objects in an area or mapping an area.

FIG. 8 is a block diagram of an example method for mapping of objects in an area or mapping an area, in accordance with at least some embodiments described herein. Method 800 shown in FIG. 8 presents an embodiment of a method that, for example, could be used with the systems 100 and 400, for example, and may be performed by a device, such as another devices illustrated in FIGS. 1-4, or components of the device. The various blocks of method 800 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 802, the method 800 includes receive data gathered by a computing device associated with objects in an area. For example, a robot may traverse an area and capture raw data (e.g., such as point map data) and images (e.g., still or video feed) using a range camera, video camera, still camera, etc. The robot may provide the gathered data to the cloud, which may receive the gathered data. Additionally, the cloud may receive gathered metadata associated with the objects in the area, such as a time the data was collected, a location (e.g., GPS location) at which the data was collected, or other characteristics regarding when/how the data was collected.

At block 804, the method 800 includes perform object recognition on the gathered data. A server on the cloud may interpret objects, and further, shapes can be matched with a three-dimensional warehouse or database of objects to identify representations of the point maps. The server may use any type of object recognition methods, such as by matching edges, colors, variances, etc., of the gathered data to known objects within a database. The objects within the database may have associated metadata indicating characteristics of the objects.

Thus, the server can perform object extraction to identify and extract objects from the received data. The server can further localize the objects precisely in a map and provide annotations for the objects. Example annotations include mass, shape, material, etc. of the object. Annotated objects may be stored and shared through a global object database, such as, the database 412 in FIG. 4.

At block 806, the method 800 includes generate a map of the area based on the gathered data. For example, the server may use locations of the data collected as well as times the data was collected to interpret a path traversed by the robot and to create a conceptual map. The map may be further generated based on circumstantial data of the recognized objects, such as size and shape of the object. If an object has a known size and shape, and the location of the object is known, an estimated area at which the object is present can be determined.

At block 808, the method 800 includes insert computer images of the objects into the map. For example, the server may retrieve a computer image of the recognized object (e.g., television), and insert the object into the location on the generated map at which the object is present.

At block 810, the method 800 includes associate data with the computer images. For example, the server may associate any number of metadata with the computer image, or may alternatively, retrieve metadata or other high resolution images representing the object from a retailer's database for insertion into the computer generated map. As described above, an image of a couch may be captured, and the server may identify a specific model of the couch, and perform a search within a database to locate/identify a retailer that manufactures/sells the couch. A server in the cloud may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Thus, in some examples, a robot builds shapes and appearances of all objects in a scene and performs object recognition as possible (with the help of the cloud) to provide an annotated map of objects. Raw data is gathered (e.g., point map) and used with camera data (e.g., indicates color/texture of objects) to interpret objects, and further, shapes can be matched with a 3D warehouse of objects to identify representations of the point clouds.

Figure 9A:
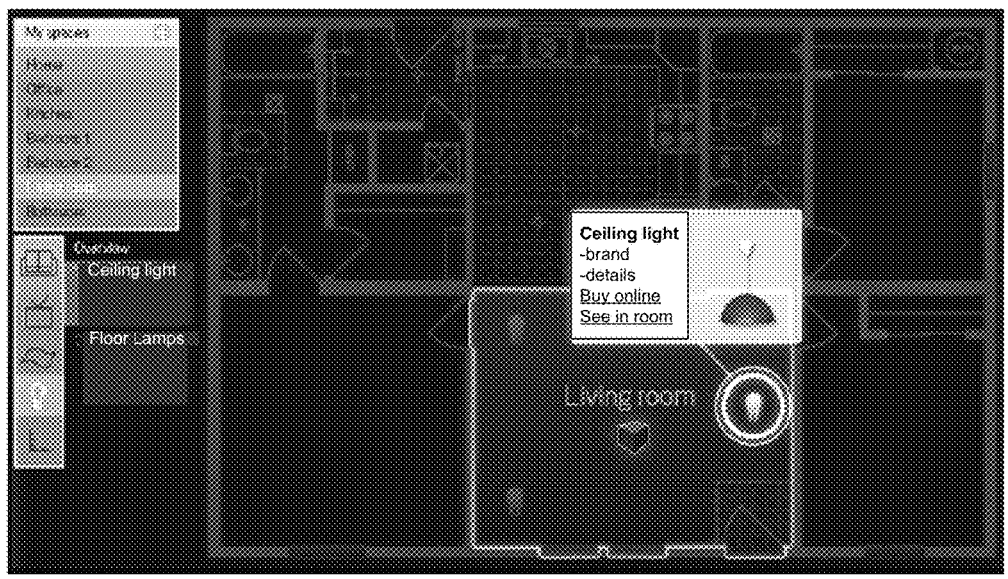
FIGS. 9A-9B are example interfaces illustrating a map of an area, and objects in the map.
Figure 9B:

FIGS. 9A-9B are example interfaces illustrating a map of an area, and objects in the map. For example, in FIG. 9A, a home has been outlined (e.g., in a blueprint format) to show different rooms in the home. Items in the home may also have been mapped. FIG. 9B illustrates an example interface illustrating mapping of objects in a room. In some examples, the interfaces in FIGS. 9A-9B, and methods described herein, may enable a user to determine configurations of rooms, and objects in the rooms. As one example, a user may be in a store and identify a few television stands that the user would like to purchase; however, the user would like to see how the television stands look/fit into the room configuration. The user may capture some images of the television stands using a device, cause the device to perform object recognition (e.g., using the method 500 in FIG. 5), access the interface in FIG. 9A to select a room in which to place the television stand, and access the interface in FIG. 9B to insert the new television stand in place of an old television stand (e.g., swap out the old television stand with the new television stand and place the television and peripherals into a desired configuration). The example interfaces in FIGS. 9A-9B may be used to maneuver computer generated objects in a room, for example.

In further examples, the interfaces in FIGS. 9A-9B may provide information (e.g., metadata) regarding rooms or objects in the rooms as determined during a mapping of the room. For example, the interface in FIG. 9A may indicate details regarding a ceiling light, such as a brand name, a model number, details regarding light bulbs used by the ceiling light, etc., and the metadata may provide links to purchase the ceiling light or accessories online, or a link to see the ceiling light in the room, such as a link to the example interface in FIG. 9B.

c. Navigation Functions

Referring back to FIG. 7, in one example, the robot 700 may receive instructions to navigate from point A to point B across the area 706. The robot 708 may have completed this navigation previously, and may have uploaded information regarding a possible navigation pathway to the cloud. The robot 708 may have documented objects along the pathway, and also, possible obstructions as well. The robot 700 may query the cloud requesting navigation instructions to traverse from point A to point B (e.g., a map), and may receive in response, the navigation pathway shown in FIG. 7 as previously traveled by the robot 708. In this manner, the robots may share information to enable learning of the area 706.

In addition, the robot 700 may have limited memory, and in one example, to enable and manage updates, a server may include or store data to be provided to the robot 700. For instance, the robot 700 may not download "the entire world" of data, but rather, may download data representing immediate surroundings into a local cache to perform actions, such as to traverse through a portion of the area 706. The robot 700 may download additional data when needed. Furthermore, downloads can occur from the server to the robot 700, or through peer-to-peer sharing (e.g., from the robot 708 to the robot 700). Still further, basic instructions for mobility, safety, and general robot operation can be stored on-board the robot 700, while instructions for higher-level functionality may be stored in the cloud 702 and accessed by the robot 700 as needed. In some examples, the robot 700 can use "Just in Time" downloading where high level data can be downloaded first, followed by lower level data streamed as needed. In some examples, providing business logic stored in the cloud 702 enables fleet-wide upgrades to all robots.

In addition, "slug" trails may be used for shared information (i.e., information that may be used for object recognition). A slug trail may be indicative of previous requests and matching responses. Thus, in a multi-node system, the request/response can be cached so that future requests hit an answer sooner in path. For example, if the robot 700 is navigating through the area 706 and notices a hallway is blocked, the robot 700 can publish an update on the pathway so that other robots learn of the obstacle and other problems/constraints, and may request/receive an alternate pathway. Any interaction that the robot 700 experiences can be published to the cloud so that the robot 700 logs interactions to be shared amongst all robots. Specific locations may trigger robots to download new information. For example, when entering a new room, data about the room may be retrieved that was collected by another robot.

d. Inventory/Differential Functions

Figure 10:
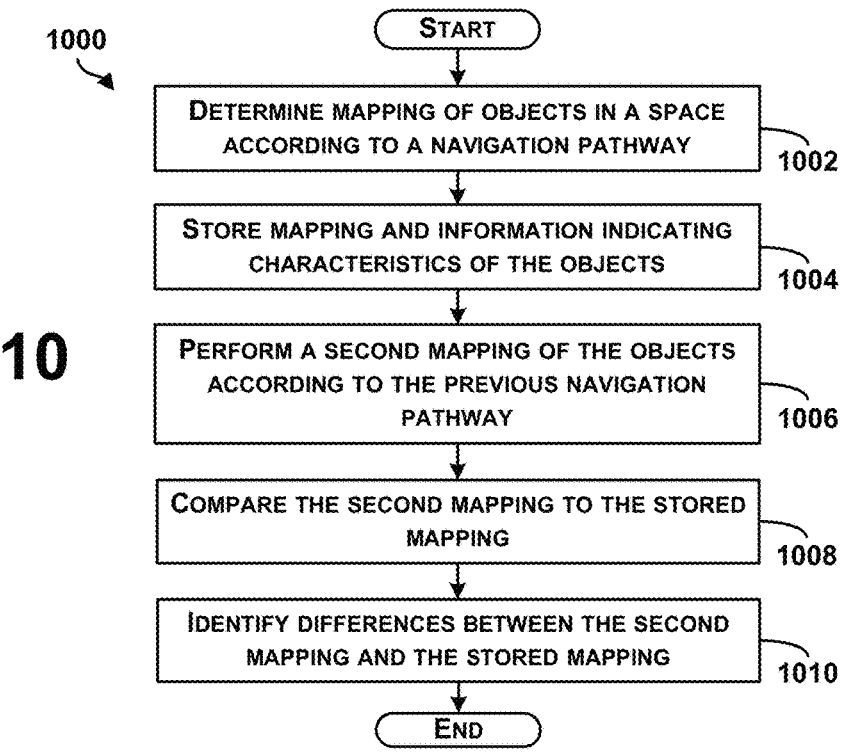
FIG. 10 is a block diagram of an example method for mapping of objects in an area and performing inventory of objects.

FIG. 10 is a block diagram of an example method for mapping of objects in an area and performing inventory of objects, in accordance with at least some embodiments described herein. Method 1000 shown in FIG. 10 presents an embodiment of a method that, for example, could be used with the systems 100 and 400, for example, and may be performed by a device, such as another devices illustrated in FIGS. 1-4, or components of the device. The various blocks of method 1000 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1002, the method 1000 includes determine mapping of objects in a space according to a navigation pathway. For example, a robot may move through an area and perform object recognition and generate a map, as described above using method 500 in FIG. 5 and method 800 in FIG. 8. The robot may be configured to follow a predetermined navigation pathway through an area, or may follow a random navigation pathway through the area. The robot may store or associate the navigation pathway with the determined mapping of the area, so that a record is formed of the navigation pathway used to determine the mapping. In one instance, based on the navigation pathway, the mapping may be different (e.g., a robot may not map an entirety of an area or take account a full inventory of all objects in an area).

The mapping of the area may be, in one example, an inventory of objects in the area. As the robot traverses through the area capturing images and performing object recognition, the robot may determine what objects are present, and determine locations of objects in the area.

At block 1004, the method 1000 includes store mapping and information indicating characteristics of the objects. For example, the robot may store the mapping locally on memory of the robot or within the cloud. The robot may further store associated information indicating characteristics of the objects with the mapping of the objects, such as, metadata describing details of the objects (weight, color, model number, size, shape, etc.).

At block 1006, the method 1000 includes perform a second mapping of the objects according to the previous navigation pathway. For example, at a later time, the robot may perform another mapping of the area using the same navigation pathway so as to take an inventory of the area at the later time. The robot may follow the same (or substantially same) navigation pathway previously used so that the same (or substantially same) mapping of the area and objects in the area can be determined.

At block 1008, the method 1000 includes compare the second mapping to the stored mapping, and at block 1010, the method 1000 includes identify differences between the second mapping and the stored mapping. By comparing the two mappings, differences between the mapping can be identified to determine differences in the inventoried objects.

As an example using the method 1000 of FIG. 10, a user may configure an area (e.g., bedroom) into a default configuration (e.g., where all clothes are picked up off the ground, items are arranged and the room is cleaned). The user may request the robot to perform a mapping and inventory of objects in the bedroom with the bedroom in the default configuration. Following, if the user has misplaced an item, the user may request the robot to perform a new inventory of the room, and the new inventory can be compared to the default inventory to determine what changes have been made to the bedroom (e.g., what objects are not in the default location).

As another example using the method 1000 of FIG. 10, a user may configure a stock room at a retail store into a default configuration (e.g., all shelves are fully stocked). The user may request the robot to perform a mapping and inventory of objects in the stock room with the room in the default configuration. Following, the user may request the robot to perform a new inventory of the stock room to determine what items have been sold. The new inventory can be compared to the default inventory to determine what changes have been made to the stock room, such as, to indicate a current supply of items in the stock room that can be used to configure future orders. The default inventory map may thus be a benchmark map of the room in a clean state, so that subsequent maps can be performed to determine a differential between the benchmark and a current condition of the room.

Thus, in some examples, a robot may create an inventory of objects in a room or scene, along with a mapping of the objects to catalog all objects in the space and to store details of the objects (e.g., name, shape, color, last known location, etc.). The robot may have a navigation path that is followed to inventory a space, so that the same navigation path can be traversed to identify missing/new objects.

e. Voice Recognition/Control

Figure 11:
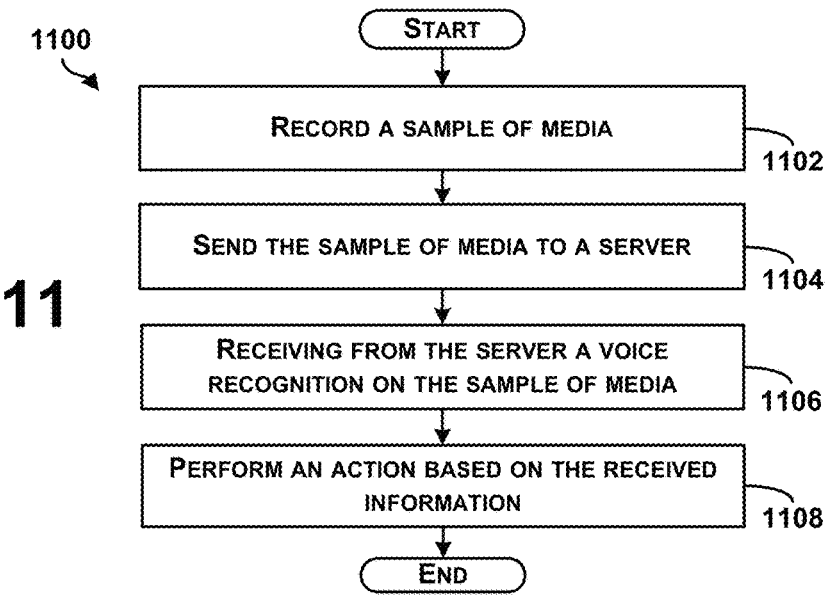
FIG. 11 is a block diagram of an example method for performing voice recognition/control by a robot.

FIG. 11 is a block diagram of an example method for performing voice recognition/control by a robot, in accordance with at least some embodiments described herein. Method 1100 shown in FIG. 11 presents an embodiment of a method that, for example, could be used with the systems 100 and 400, for example, and may be performed by a device, such as another devices illustrated in FIGS. 1-4, or components of the device. The various blocks of method 1100 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1102, the method 1100 includes record a sample of media. For example, a user may interact with a robot by speaking to the robot, and the robot may record the speech of the user. The robot may record samples of speech from other areas as well (e.g., televisions, radio, etc.) and of other types of media, such as music, video, live performances, etc.

At block 1104, the method 1100 includes send the sample of media to a server. For example, the robot may be configured to communicate with a server (e.g., the "cloud"), and may send the sample of media using wired or wireless communication to the server.

At block 1106, the method 1100 includes receiving from the server a voice recognition on the sample of media. The server may use any number of known techniques for performing voice recognition, and may provide a response to the robot. The voice recognition response may include a textual equivalent of the speech, such as when the server performs speech to text processes.

At block 1108, the method 1100 includes perform an action based on the received information. In one example, the voice recognition response may also include a command or instructions indicating actions for the robot to perform. In this example, the server may perform a voice recognition, and may further identify actions to be performed by the robot in response to the voice recognition. As a specific example, the user may speak "call John" to the robot. The robot may record the speech and send the speech sample to the server. The server may recognize the speech, and return a voice recognition response to the robot with instructions for the robot to call a user named John at the phone number 555-1234. The robot may then initialize a phone call to John using internal phone capabilities. If the robot is not equipped with a wired or wireless telephone, the voice recognition response may further include instructions to the robot for how to initialize the phone call, such as to provide a map to the robot of where a telephone is located, provide a navigation pathway to the robot to instruct the robot how to traverse to the telephone, provide instructions how to use the telephone to the robot, and provide the phone number of John to the robot.

f. Contextual/Situational Robot Functions

A robot may perform any actions or queries to the cloud as described herein based on contextual or situational information.

In an example, a robot may have information relating to a local environment in which the robot operates (e.g., a local map, a location, etc.) and this information can be used as constraints for recognition systems that are used to identify objects within captured data by the robot. For example, if the robot is in an office, the robot may access an "office" database of objects within the cloud to perform object or data recognitions. Thus, the robot may send to the cloud a query to determine or identify an object within gathered data, and the query may include contextual information, such as an indication of a location of the robot. The server may use the contextual information to select a database in which to search for a matching object.

Thus, in some examples, a robot may use location, or possible nearby objects as constraints into recognition systems to provide a context of the environment enabling object recognition to be performed using a subset or a limited set of nouns/verbs/objects to improve recognition accuracy.

As another example, the robot may operate with situational awareness such that a robot may inventory objects in a scene, and if given a command by a user, the robot can determine the content or interpret the meaning of the command based on a situation of the scene or by comparing with objects in the scene (e.g., command is to retrieve a cola from the refrigerator, and robot can use limited database warehouse of objects associated with "house" to quickly identify refrigerator/cola, etc.). The robot may be configured to use contextual as well as situational data to help perform decision making.

In still another example, a robot may perform actions using contextual/situational data, such as time of day, weather outside, etc. For example, at night a robot may be configured to move more slowly and make less noise to be quiet than as compared to operations during the day. In another example, in the morning a robot may offer coffee to a person as opposed to a soft drink. Other situational examples that may affect configurations of robot actions include if the weather is rainy, the robot may offer an umbrella to the person, or based on what a person is wearing, the robot may offer suggestions as to whether the person will be hot/cold due to weather. Thus, the robot may take context/situation into account, as well as whom the robot is interacting with when determining an appropriate response/function. Still further, a robot may make a sound of presence, intent, state, based on context/situations.

As still another example, a voice recognition database (or information from a voice recognition database) may be provided to a client device (e.g., robot) to enable the robot to perform voice/speech recognition locally. The voice recognition database may be provided based on a current state of the robot. As an example, if a robot is in an office setting, an office database for voice recognition may be provided to the robot to enable a voice recognition process to be performed more quickly than having the robot search within a database for all settings. Any situational or contextual information of the robot may be used to select a voice recognition database to provide to the robot. As other examples, a time of day, context of a conversation, location of the robot, etc. may be used individually or in combination to select a voice recognition database to provide to the robot.

g. Interactive Mapping Functions

A robot may use mapping data stored on the cloud to provide interactive functions.

In an example, a robot may receive a command. The command may relate to map data stored on the cloud. In one embodiment, the command may ask for directions to a specific place. In another embodiment, the command may ask for the location of a specific item. In a further embodiment, the command may ask for the name for a specific item. In yet another embodiment, the command may combine map data from the cloud with other data stored on the cloud, such as asking for occupants of conference room.

The command may be received in various forms. The robot may have a microphone and receive the command as spoken voice. The robot may have an infrared (IR) port and receive a command from an IR source, such as a remote control. Additionally, the command may be received via a radio frequency (RF) or wired link as well.

After receiving a command, the robot may transmit the command to the cloud. In one embodiment, the command is transmitted to the cloud wirelessly. The data transmitted may be the exact command given to the robot, i.e. the raw audio file may be transmitted, or the command may be compressed or manipulated before being transmitted. For example, a processor located in the robot may translate a command received as audio into a different format before transmitting it to the cloud. In another embodiment, a processor in the robot may translate a received wireless signal, such as an RF signal or an IR signal, into a command format that can be sent to the cloud. The robot may transmit the command via a cellular data connection, as data transmitted over a telephone call, over a local area wireless network, or over other types of wireless connections.

When the cloud receives a command, it responsively transmits interactive map data to the robot, based on the command. The interactive map data may take many forms. In one embodiment, the map data is provided as a database of coordinates with associated information about each coordinate. The coordinates may be based on GPS locations or the coordinates may be based on the robot's frame of reference. The coordinates may include a list of instructions and commands for the robot to perform.

The robot can perform an action in response to receiving interactive map data. The robot may optically project a subset of the interactive map data on its surroundings, such as a surface of a wall or the surface of the ground. The robot may know its exact location due to a variety of sensors on located on it. The robot may use a combination of GPS, imaging sensors, altimeter, and other sensors to determine its precise location. In one example embodiment, the robot may optically project a path on the ground based on the interactive map data. The path may show the way to a specific place or the location of a specific item. For example, if a robot is asked, "How do I get to the bathroom?" the robot can optically project a path to the bathroom on the ground.

In some additional embodiments, the robot may also have the ability to move. The robot may move along the projected path, while updating the projection. For example, the bathroom may be down the hall and around the corner. The robot will project the path and move down the hall way. The path will update and turn around the corner at the end of the hall. Thus, the robot may act as a guide around buildings or other locations.

In another embodiment, the robot's projector may project with infrared light. Because infrared is not visible to humans, people near the robot may not see the projection. However, devices with a charge-coupled device (CCD) sensor, such as that on a video camera, digital camera, or cellular phone, may be able to see the infrared projection. Hence, the projection may only be visible through additional hardware. Therefore, people without the viewing hardware would not be aware of the projection provided by the robot.

Figure 12:
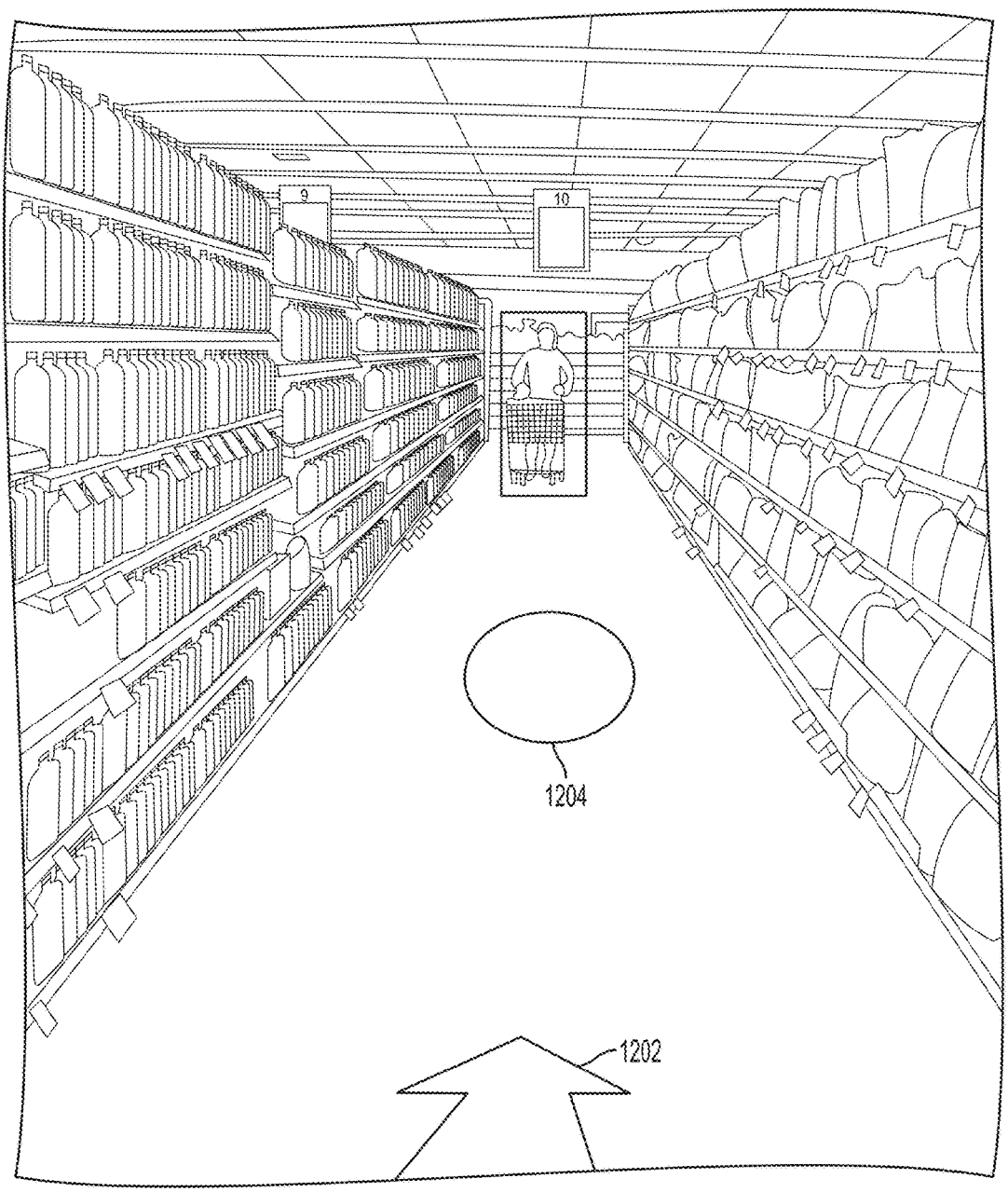
FIG. 12 is an example of a robot providing interactive map data.

FIG. 12 presents one aspect of interactive map data. In the example embodiment shown in FIG. 12, an assistance robot is providing directions to a specific product in a grocery store. The robot may identify the location of items based on the map data. For example, a robot in a grocery store may receive a command to locate a specific brand of soft drink. The robot may query the cloud and receive map data, including the location of the specific brand of soft drink. The robot may project a path indicator 1202 and move through the store to the location of the soft drink. The robot may additionally project a location indicator 1204 at a reference point in the grocery aisle where the exact soft drink is located.

The robot may direct a person to the point where they need to stand to find the product. Additionally, when the robot is situated at the correct location within an aisle, it may project an indicator at the specific product on the shelf. The robot may be able to identify the exact project based on either the mapping data or on optical or radio sensing. In some embodiments the robot may use both map data and sensing means to locate the specific product.

Figure 13:
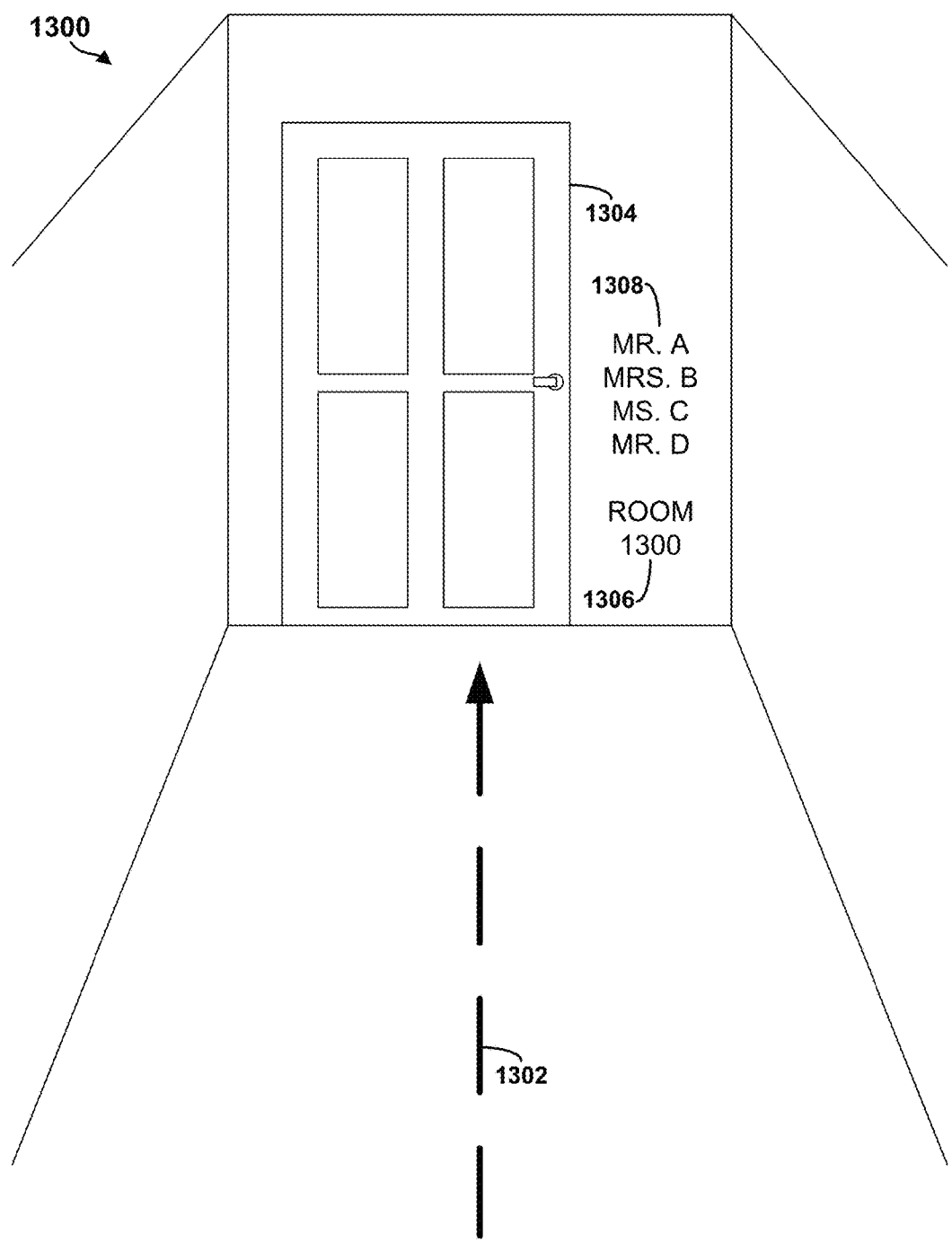
FIG. 13 is an example of a robot providing interactive map data and cloud data.

FIG. 13 presents another aspect of interactive map data. In the example embodiment shown in FIG. 13, an assistance robot is providing directions to a specific conference room. The robot may identify the location of the conference room based on the map data from the cloud.

For example, a robot in an office may receive a command to locate a conference room for a meeting. The robot may query the cloud and receive map data, including the location of the conference room. The robot may project a path indicator 1302 and move through the office building to the location of the conference room door 1304. The robot may also project a label 1306 for the specific conference room, here "ROOM 1300". In some embodiments, the cloud may provide additional data with the mapping data.

For example, the cloud may have access to calendar data for the conference room. The robot may receive the calendar data and project a list of people 1308 who are currently using the conference room on the outside call. The cloud may incorporate the calendar data in the map data that is provided to the robot. In another embodiment, the robot may be asked to locate a specific person. The robot may use the calendar data and the mapping data to locate the person and provide instructions on how to get the person's location. In an additional embodiment, a robot could project a list of upcoming meeting on the door of a conference room. This would let a person know a specific room's availability based on stored map data and cloud data.

Additionally, the map data may contain pictures of items or other data relating to objects within a room as well. For example, the map data may include the picture of the inside of a conference room; the robot may be able to project an image of the inside of the conference room on to its surroundings. Thus, a person may be able to virtually see through walls and see the inside of rooms and objects within the rooms.

Figure 14:
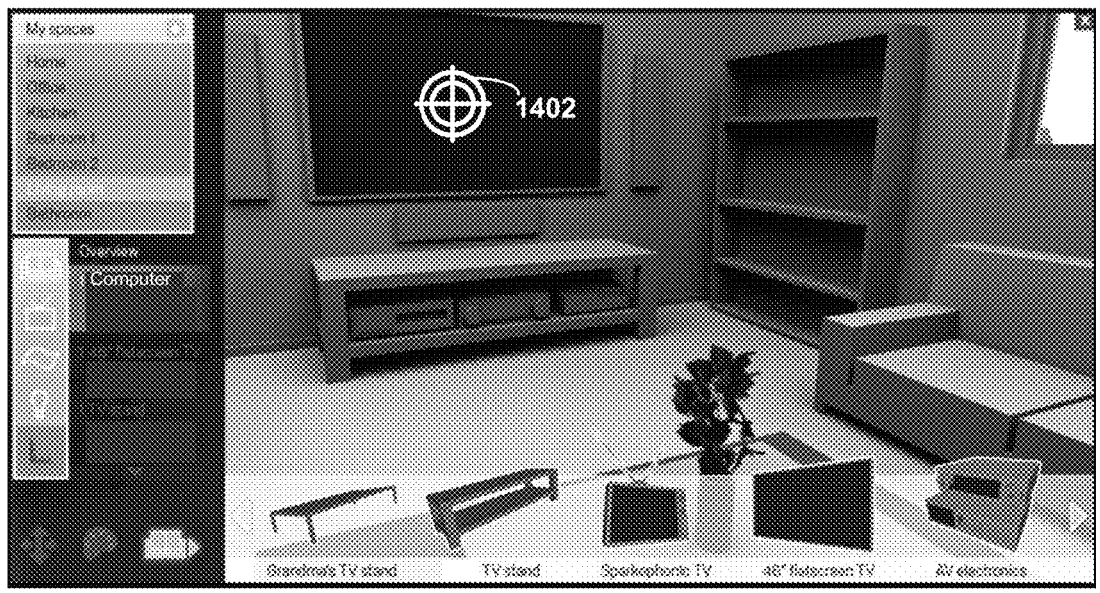
FIG. 14 is an example of interacting with a robot and interactive map data, all arranged in accordance with at least some embodiments described herein.

FIG. 14 presents another aspect of interactive map data. In the example embodiment shown in FIG. 14, an assistance robot is projecting an identifier on an object. The robot may project the identifier 1402 based on the map data from the cloud. For example, when asked to find the television, the robot may query the cloud and receive map data. After receiving the map data, the robot may project identifier 1402 on the television.

In another embodiment, after receiving the map data, the cloud may inform the robot of an unidentified object in the room, or the robot may notice an object through optical sensing means that is unidentified. The robot may switch to a learning mode. In the learning mode, the robot may place an optical identifier 1402 on the unidentified object. The robot may receive an input to identify the object. This identification could be returned to the cloud. Thus, the object may be recognized in the future. The input to identify the object could be a human voice, a wireless signal from another device, or an input on a keyboard or touch screen.

Additionally, the optical identifier 1402 may be trigged by issuing a command to the robot. For example, the robot may have misidentified an object. A person may issue a command associated with the misidentification. Responsive to receiving the command indicating the misidentification, the robot my project optical identifier 1402 on to the object. The person may then provide a second command giving a correct identification for the object. The correct identification could be sent to the cloud from the robot, thus allowing correct identification in the future.

In another example, a person may ask the robot a question, such as "where is my basketball?" The robot may relay this command to the cloud and receive map data based on the last known location of the basketball. The robot may move to a location near the basketball and project optical identifier 1402 on to the basketball. Thus, the interactive map data allows for the robot to locate specific objects that are stored in the cloud map data.

5. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

We claim:

1. A method comprising:
   receiving a command by a robot;
   querying, by the robot, a computing device with information associated with the command;
   receiving, by the robot, coordinate data associated with the command from the computing device;
   optically projecting, by the robot, at least a subset of the coordinate data on to a first surface, wherein the first surface is external to the robot;
   moving the robot; and
   optically projecting, by the robot, an updated subset of the coordinate data as the robot moves.

2. The method of claim 1, wherein the computing device is located in a different location from a location of the robot.

3. The method of claim 1, further comprising the optically projecting of an optical identification of an object based on the coordinate data.

4. The method of claim 1, wherein the optically projecting is performed via an infrared projector.

5. The method of claim 1, wherein the coordinate data comprises at least one of (i) data relating to a specific object, (ii) data relating to a location, (iii) data relating to a specific person, (iv) data relating to an event, and (v) data relating to a task.

6. The method of claim 5, further comprising optically projecting objects located within a room based on the data relating to the location.

7. The method of claim 1, further comprising:
   receiving a further input; and
   communicating the input to the computing device.

8. The method of claim 1, wherein:
   the command comprises one of an audio signal, an infrared signal, and a radio signal.

9. A robot comprising:
   a command interface configured to receive a command;
   a communication module configured to:
     query a computing device with information associated with the command; and
     receive coordinate data associated with the command from the computing device;
   a movement module configured to move the robot; and
   an optical projector configured to:
     optically project at least a subset of the coordinate data on to a first surface, wherein the first surface is external to the robot; and
     optically project an updated optical projection pathway as the robot moves.

10. The robot of claim 9, wherein the command interface comprises a microphone configured to receive a command.

11. The robot of claim 9, wherein the communication module is further configured to communicate an input related to a representation of at least a subset of the coordinate data.

12. The robot of claim 9, wherein the optical projector comprises an infrared projector.

13. An article of manufacture including a tangible non-transitory computer-readable media having computer-readable instructions encoded thereon, the instructions comprising instructions for:
   receiving a command;
   querying a computing device with information associated with the command;

receiving coordinate data associated with the command from the computing device;

optically projecting a representation of at least a subset of the coordinate data on to a first surface;

moving based on the coordinate data; and optically projecting an updated representation of at least a subset of the coordinate data based on the moving.

14. The article of manufacture of claim 13, wherein the computing device is a computer located in a different location from a location of the robot.

15. The article of manufacture of claim 13, further comprising instructions for optically projecting an optical identification of an object based on the coordinate data.

16. The article of manufacture of claim 13, further comprising instructions for performing the optically projecting via an infrared projector.

17. The article of manufacture of claim 13, wherein the coordinate data comprises at least one of (i) data relating to a specific object, (ii) data relating to a location, (iii) data relating to a specific person, (iv) data relating to an event, and (v) data relating to a task.

18. The article of manufacture of claim 13, further comprising instructions for optically projecting objects located within a room based on the data relating to the location.

19. The article of manufacture of claim 13, further comprising:

instructions for receiving a further input; and instructions for communicating the input to the computing device.

20. The method of claim 13, wherein:

information associated with the command comprises one of an encoded audio signal, data communicated via the infrared signal, and data communicated with the radio signal.

* * * * *